United States Patent [19]

Sandlin

[11] 4,070,646

[45] Jan. 24, 1978

[54] PULSE ERROR DETECTOR

[75] Inventor: Tommy L. Sandlin, Irving, Tex.

[73] Assignee: Communication Mfg. Co., Long Beach, Calif.

[21] Appl. No.: 699,619

[22] Filed: June 25, 1976

[51] Int. Cl.$^2$ .......................... H03K 5/18; G06F 11/00
[52] U.S. Cl. ............................ 340/146.1 AB; 307/236; 328/118
[58] Field of Search ........... 340/146.1 AB, 146.1 AX; 235/153 AS, 92 EC, 92 EV; 307/232, 236; 328/109, 118

[56] References Cited

U.S. PATENT DOCUMENTS

| | | | |
|---|---|---|---|
| 3,418,631 | 12/1968 | Sipress et al. | 340/146.1 AB |
| 3,534,403 | 10/1970 | Matarese | 340/146.1 A X |
| 3,646,453 | 2/1972 | Garcia | 328/118 |
| 3,842,401 | 10/1974 | Smith et al. | 340/146.1 AB |
| 3,851,251 | 11/1974 | Wigner et al. | 340/146.1 A X |
| 3,886,522 | 5/1975 | Barton et al. | 340/146.1 AB |
| 3,961,203 | 6/1976 | Hutch | 340/146.1 AB |
| 3,992,636 | 11/1976 | Kiffmeyer | 340/146.1 AB |

Primary Examiner—Charles E. Atkinson
Attorney, Agent, or Firm—Christie, Parker & Hale

[57] ABSTRACT

An error detector for received pulses, which pulses normally alternately extend in opposite directions. An up-down counter has first, second, third and fourth sequential states. Means is provided for forming an error signal when the counter is in either the first or fourth state. Means is provided for resetting the counter to one of the second and third states after the counter reaches either the first or fourth state. Means is provided for receiving the pulses and for causing the counter to count up a state responsive to a pulse of one direction and for causing the counter to count down a state responsive to a pulse of the other direction.

8 Claims, 5 Drawing Figures

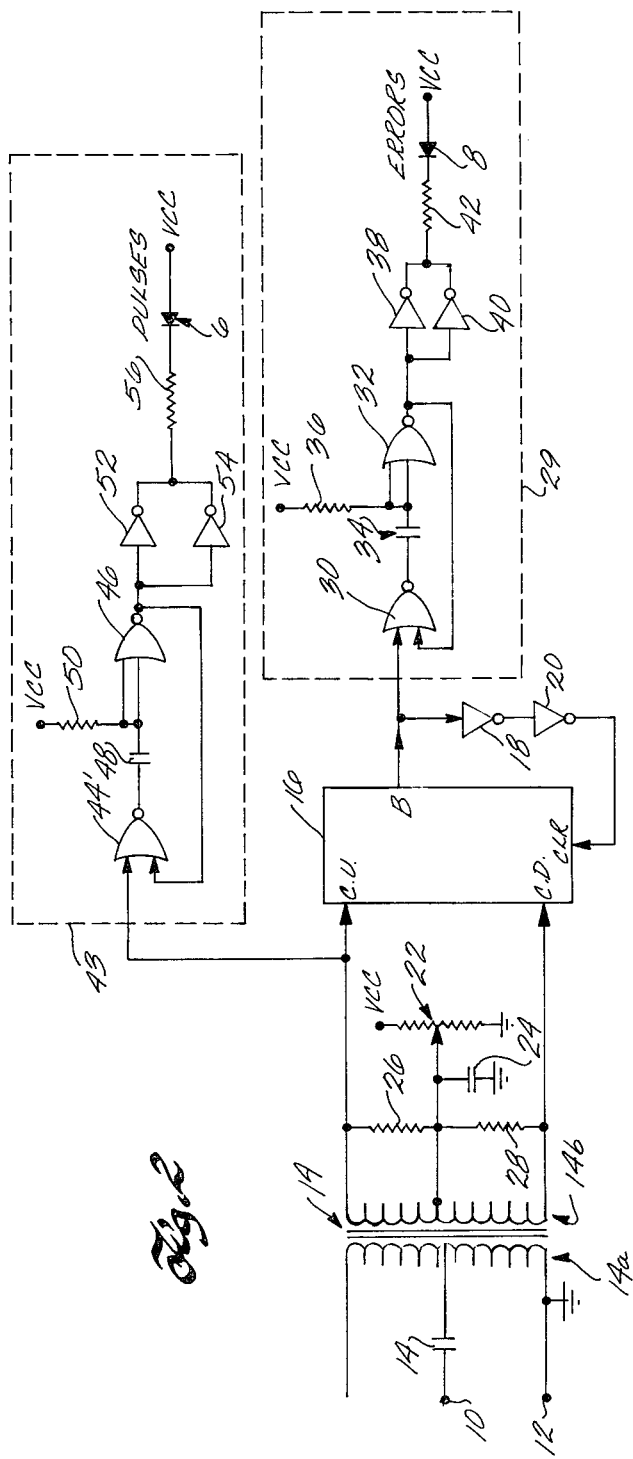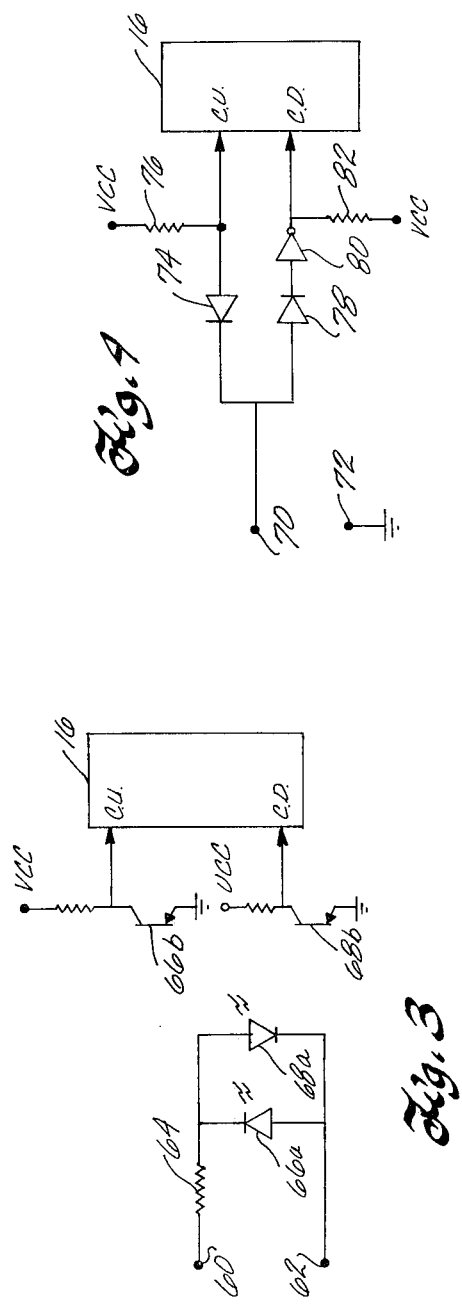

PULSE ERROR DETECTOR

BACKGROUND OF THE INVENTION

This invention relates to error detectors and more particularly to error detectors for pulse signals which alternately extend in opposite directions.

Telephone systems have what are referred to as span lines for transmitting a T-type carrier between central offices. The span line has a bipolar pulse train in a four wire configuration. One pair of wires are for transmitting and one pair are for receiving the T-type carrier.

It has been found that errors occur in the transmitting equipment for the T-type carrier. When the transmitter is operating correctly, a T carrier always has a positive pulse following a negative pulse and always has a negative pulse following a positive pulse. If the pulses do not alternate between positive and negative on successive pulses, an error is occurring and must be detected promptly for service or repair.

Test sets exist for detecting errors in the T carrier. However, known test sets are complicated, expensive and require adjustments such as by a switch. One device requires a switch to switch the test set to one state to monitor the T carrier for errors and to switch the test set to another state for monitoring the T carrier for merely the presence of pulses.

SUMMARY OF THE INVENTION

The present invention is a simplified error detector for received pulses which pulses normally alternately extend in opposite directions. Although not limited thereto, preferably the error detector is for detecting errors in a T carrier. Significantly, the error detector according to the present invention does not require any external switches but is a small hand-held device, slightly smaller than most conventional hand-held calculators, with merely an indicator. Preferably the indicator includes one light emitting device for indicating when pulses are present in the T carrier and a second indicator for emitting light when an error occurs in the T carrier.

Briefly, an embodiment of the present invention comprises an error detector for received pulses which pulses normally alternately extend in opposite directions. An up-down counter has first, second, third and fourth sequential states. Means is provided for forming an error signal when the counter is in either the first or fourth state. Means is provided for resetting the counter to one of such second and third states after the counter reaches either the first or fourth state. Means receives the pulses and causes the counter to count up a state responsive to a pulse of one direction, and for causing the counter to count down a state responsive to a pulse of the other direction.

Preferably, means is provided for forming a signal indicative of the presence of at least one of the pulse signals.

According to a further preferred embodiment of the invention the error detector includes a direct current isolation means for coupling in between the received signal and the counter.

According to a still further preferred embodiment of the invention the means for causing the counter to count has first and second output circuits coupled to the counter and includes means for forming, respectively, up and down count signals at the first and second output circuits.

A further preferred embodiment of the invention comprises means responsive to the error signal for forming a visual indication of an error.

An even further preferred embodiment of the invention includes an indicator responsive to the signal indicate of the presence of at least one of the pulse signals for providing a visual indication.

DESCRIPTION OF DRAWINGS

FIG. 2 is a schematic diagram of the pulse error detector and embodying the present invention;

FIG. 3 is an alternate embodiment of a portion of the pulse error detector of FIG. 2 and embodying the present invention;

FIG. 4 is an alternate embodiment of a portion of the pulse error detector of FIG. 2 and embodying the present invention.

DETAILED DESCRIPTION

The pulse error detector is a test set preferably used to test the span lines used by the T-type carrier between central offices in a telephone system. The span lines have a bipolar pulse train on a four wire configuration. One pair of lines is for transmission and the other pair is for receiving the T-type carrier.

Figure 1:
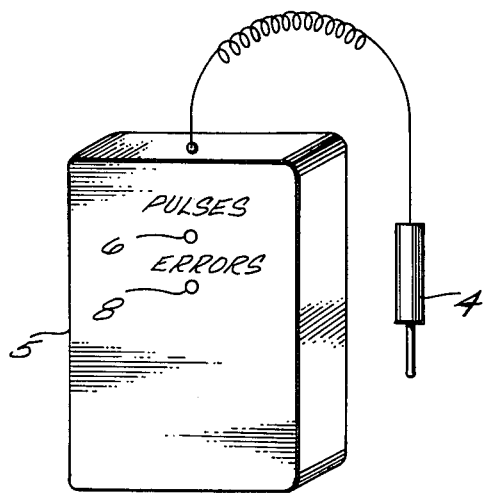
FIG. 1 is a schematic and pictorial view of the pulse error detector and embodying the present invention.

FIG. 1 shows a schematic and pictorial view of the pulse error detector and embodies the present invention. A conventional two conductor plug 4 is depicted for insertion, preferably into the monitor jack of the central office repeater from which the T carrier signal is received. The jack 4 is connected through a cord to the housing 5 which contains electronics constructed in accordance with the present invention. Significantly, the test set does not have any switches or other complicated adjustments to make. Only two LEDs 6 and 8 are provided along with their respective labels. The LED 6 when lit indicates that PULSES are present in the T carrier signal. Lighting of the LED 6 does not in any way indicate whether or not the pulses are of the right polarity.

Significantly, the LED 8 is for indicating ERRORS. If two successive positive pulses occur or two successive negative pulses occur, the LED 8 will light, indicating an error.

Figure 5:
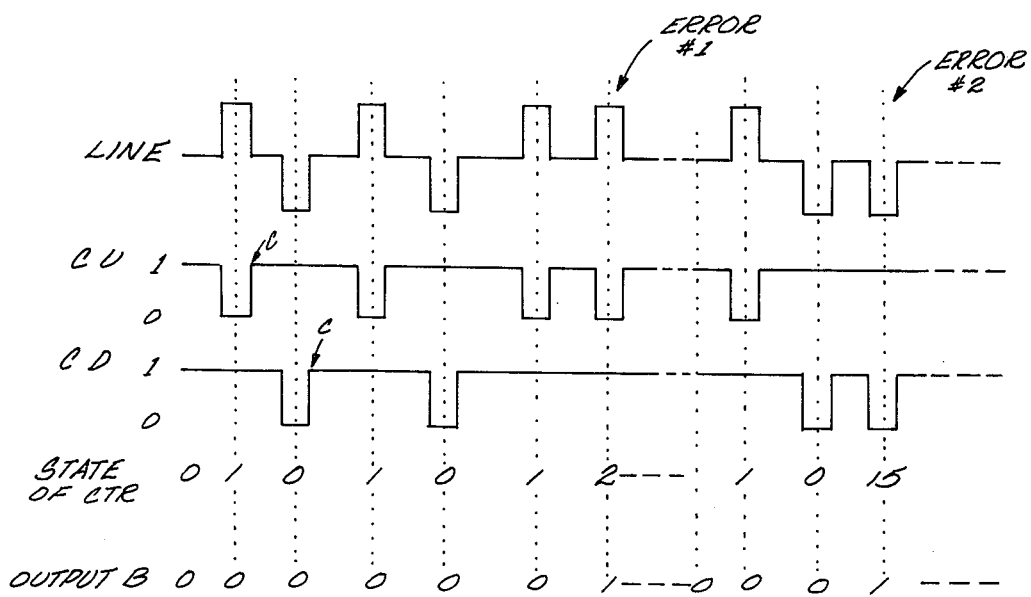
FIG. 5 is a truth and pulse diagram illustrating the operation of the pulse error detector.

Refer now to FIG. 2. The pulse error detector accepts the T carrier signal, preferably from the monitor jacks of the central office repeater across the input conductors 10, 12 which in turn are connected across the two conductors (not shown) of the plug 4. The T-type carrier is as generally depicted in FIG. 5 at LINE.

The T carrier signal is fed through a capacitor 14 to the primary winding 14a of an input transformer 14. The secondary winding 14b of the transformer 14 has its opposite sides connected to, respectively, the count up (C.U.) and count down (C.D.) inputs of an up-down type counter 16.

The up-down counter 16 is a conventional CMOS type of counter and hence minimizes power loss in the pulse error detector. Although only four sequential states are necessary to the present invention, the counter has 16 states numbered 0 to 15. Only states 15, 0, 1 and 2 are effective and are used in the disclosed embodiment of the invention. The counter counts sequentially from state 0 to states 1 and 2 responsive to two sequential up pulses and counts down from state 1 to state 0 and 15 responsive to two sequential down pulses.

The B output forms a means for forming an error signal when the counter 16 is in either of states 15 or 2. The error signal at the B output of the counter is a positive polarity signal. Two inverters 18 and 20 are serially connected from output B to the clear (CLR) input of the counter 16. As a result, whenever the error signal appears at the output B, the counter is reset to state 0.

Referring to FIG. 5, the secondary winding 14b of the transformer is polled so that a positive pulse of the T carrier causes a negative pulse at the C.U. input of the counter 16, and a negative pulse of the T carrier causes a negative pulse at the C.D. input. The positive pulses of the signals at the C.U. and C.D. inputs are not shown for simplicity. The CMOS counter 16 is responsive to a positive transition of the negative pulse such as that at C in FIG. 5 for causing the counter to either count up or down depending on whether the signal is applied at the C.U. or C.D. input, respectively. Simultaneously the signal at the other input must be at a positive or logic 1 level or higher.

Resistors 26, 28, the capacitor 24, and the potentiometer 22, the latter being connected between a source of potential VCC and ground, are used to set the proper logic 1 level on the inputs to the counter 16. This is done by adjustment of potentiometer 22.

It should now be seen that the transformer 14 forms a means for receiving the pulses from the T carrier and for causing the counter to count up, responsive to a received pulse in one direction, and for causing the counter to count down a state, responsive to a received pulse in the other direction.

Refer now to the pulse and truth diagram of FIG. 5 and consider the operation of the error detector.

Initially the counter 16 is in state 0. Assume that the polarity of the initial pulse, applied between terminals 10 and 12 by the T carrier, is a positive pulse. The transformer 14 applies a negative pulse at the C.U. input of the counter 16. The trailing edge of the signal at C.U. causes the counter to count from state 0 to state 1. Normally the next sequential pulse will be a negative pulse in the T carrier. This will cause a negative pulse at the C.D. input of the counter 16. The trailing edge of the negative pulse at C.D. causes the counter to count from state 1 back to state 0. This operation repeats for each subsequent pair of pulses on the line, provided that the positive pulse is followed by a negative pulse and a positive pulse follows each negative pulse.

It should also be seen that the input B of the counter 16 will remain low, or false, represented by a 0 in FIG. 5.

Assume now that an error occurs as indicated at ERROR NO. 1 in FIG. 5. ERROR NO. 1 is a positive pulse following the preceding positive pulse. The first positive pulse in the T carrier causes the counter 16 to count to state 1. The second pulse, which is the pulse that is in error, causes a second count-up pulse to be applied at the C.U. input of counter 16, causing the counter to count to state 2. When this occurs the B output of the counter 16 forms a high or true signal, thereby indicating an error. The high signal at the B output causes inverters 18 and 20 to apply a clear signal to the CLR input of the counter 16, thereby resetting the counter to state 0.

Consider now the operation when a negative pulse follows a preceding negative pulse as indicated at ERROR NO. 2 in FIG. 5. The first negative pulse causes the counter 16 to count down from state 1 to state 0. The second negative pulse causes the counter 16 to count from state 0 to state 15. When this occurs a true or high signal appears at the B output, causing the inverters 18 and 20 to again apply a clear signal to the CLR input of counter 16, resetting the counter to state 0.

Note that each time counter 16 reaches either state 2 or state 15, a high or true signal is applied at the B output thereby indicating an error in the T carrier signal.

Means is provided for forming a visual indication of the error signal. To this end a NOR type logic gate 30 has one input connected to the B output of the counter 16 and a second input connected to the output of a further NOR gate 32. The output of the NOR gate 30 is connected through a capacitor 34 and resistor 36, differentiator circuit to the input of the NOR gate 32. The NOR gate 32 has both of its inputs tied together to the output of the differentiator circuit. The resistor 36 is connected between the capacitor 34 and the VCC source of potential. The NOR gate 32 is connected through a pair of parallel connected inverter circuits 38 and 40 whose outputs are serially connected through a resistor 42 to the cathode of the LED 8. The anode of the LED 8 is connected to the VCC source of potential.

With this arrangement the high signal at output B of the counter 16 causes the NOR gate 30 to apply a negative pulse to the capacitor-resistor differentiator 34–36. The negative signal to the input of the NOR gate 32 causes its output to go high which in turn is applied to the input of the NOR gate 30. In this manner a one-shot type of operation is formed in which the output of NOR gate 32 is held low and the output of NOR gate 32 is held high. When the capacitor 34 charges up, the input of NOR gate 32 goes high, causing the output of NOR gate 32 to again return to a low level. In this manner the NOR gates 30 and 32 and the capacitor-resistor differentiator circuit stretches the error pulse formed at the B output sufficiently long to energize the ERRORS LED 8, in the manner to be described, so that it can be seen visually.

The positive pulse at the output of the NOR gate 32, which occurs when the error signal appears at B, is inverted by inverters 38 and 40, applying a low signal at their outputs of approximately 0 volts. Current then flows from the VCC source of potential through the LED 8 and the resistor 42, causing the LED 8 to light and thereby indicate that an error has occurred.

A second means for providing a visual indication is provided for lighting the LED 6 to thereby indicate that pulses, of any type, are present in the T carrier signal. To this end the upper side of the secondary winding 14b, which is connected to the C.U. input of counter 16, is connected through a pulse stretching circuit formed by NOR gates 44, 46, capacitor 48, resistor 50, and inverters 52, 54, which are connected identical to the pulse stretching circuit formed by the corresponding elements 30, 34, 36, 38 and 40. The output of the pulse stretching circuit is connected through the serially connected resistor 56 and the LED 6 to the VCC source of potential. Whenever a positive pulse appears at the C.U. input of the counter 16, the pulse extending circuit causes current to flow through the PULSES LED 6, thereby causing it to illuminate and indicate that pulses are present.

It should be noted that the transformer 14 forms a means for direct current isolation in between the T carrier signal applied between conductors 10 and 12 and the counter 16. Thus, changes in DC level of the T carrier signal have no effect on the counter.

FIG. 3 depicts an alternate means for receiving the pulses and for causing the counter 16 to count up a state responsive to a pulse of one direction and for causing the counter to count down a state responsive to a pulse of the other direction. Specifically, conductors 60 and 62 are connected to the two conductors (not shown) of the plug 4. An optical coupler formed by a light emitting diode 66a and a light sensitive transistor 66b, provides negative pulses to the C.U. input of the counter 16. Similarly an optical coupler formed by a light emitting diode 68a and a light sensitive transistor 68b applies negative pulses to the C.D. input of the counter 16. The light emitting diodes 66a and 68a are connected in parallel in opposite directions across the conductors 60 and 62. A current limiting resistor 64 limits the current flow through the light emitting diodes. Significantly the means for causing the counter 16 to count, depicted in FIG. 3, by virtue of the optical couplers, also isolates the T carrier line from the counter 16 with the attendant advantages mentioned with respect to FIG. 2.

Another alternate means for receiving the pulses from the T carrier line and for causing the counter to count up a state responsive to a pulse of one direction and for causing the counter to count down a state responsive to a pulse of the other direction, is depicted in FIG. 4. Here the input conductors 70 and 72 are connected to the two conductors (not shown) of the plug 4. The conductor 70 is connected through a diode 74 to the C.U. input of counter 16. The junction of the C.U. input and the anode of the diode 74 are connected through a resistor 76 to the VCC source of potential. The conductor 70 is also connected through a diode 78 and an inverter 80 to the C.D. input of the counter 16. The junction between the inverter 80 and the C.D. is connected through a resistor 82 to the VCC source of potential. With this arrangement each positive pulse applied on the conductor 70 with respect to 72 causes the negative going count-down signal to be applied through the diode 78 and the inverter 80 to the C.D. input of the counter 16. Each negative going pulse applied causes the diode 74 to apply the negative pulse to the C.U. input.

Significantly, the NOR gates and inverter circuits as well as the counter are preferably made of CMOS type logic. To provide the low level of current required to operate the circuitry, a small battery is used to supply the positive VCC source of potential.

Although an exemplary embodiment of the invention has been disclosed for purposes of illustration, it will be understood that various changes, modifications and substitutions may be incorporated into such embodiment without departing from the spirit of the invention as defined by the claims appearing hereinafter.

What is claimed is:

1. An error detector for received pulses which pulses normally alternately extend in opposite directions, comprising:
   a resettable up-down counter having first, second, third and fourth sequential states;
   means for forming an error signal when said counter is in either said first or fourth state;
   means for resetting said counter to one of said second and third states after said counter reaches either said first or fourth state; and
   means for receiving said pulses and for causing said counter to count up a state responsive to a pulse of one direction and for causing said counter to count down a state responsive to a pulse of the other direction.

2. The error detector of claim 1 comprising means for forming a signal indicative of the presence of at least one of said pulses.

3. The error detector of claim 1 comprising direct current isolation means for coupling between the received pulses and said counter.

4. The error detector of claim 1 wherein said means for causing said counter to count up and down comprises first and second output circuits coupled to the counter and means for forming, respectively, up and down count signals at said first and second output circuits.

5. An error detector and indicator for received pulses which pulses normally alternately extend in opposite directions, comprising:
   a resettable up-down counter having first, second, third and fourth sequential states;
   means for forming an error signal when said counter is in either said first or fourth states;
   means responsive to said error signal for forming a visual indication of an error;
   means for resetting said counter to one of said second and third states after said counter reaches either said first or fourth state; and
   means for receiving said pulses and for causing said counter to count up a state responsive to a pulse of one direction and for causing said counter to count down a state responsive to a pulse of the other direction.

6. The error detector of claim 5 comprising means for forming a signal indicative of the presence of at least one of said pulses, and an indicator responsive to said signal indicative of the presence of a pulse for providing a visual indication.

7. An error detector for received pulses which pulses alternately extend in opposite directions, comprising:
   a resettably up-down counter having first, second, third, and fourth sequential states;
   means for forming an error signal when said counter is in either said first or fourth state;
   signal extending means for said error signal;
   means responsive to said extended error signal for forming a visual indication;
   means for resetting said counter to one of said second and third states after said counter reaches either said first or fourth states;
   isolation means for receiving said pulse signal and for applying up and down count signals to said counter corresponding respectively to pulses extending in first and second directions;
   means responsive to the presence of at least one of said pulses for forming a pulse present signal; and
   means responsive to said pulse present signal for forming a visual indication.

8. The error detector of claim 5, in which the error signal is a pulse and the means for forming a visual indication of an error comprises a visual indicator, means for stretching the error signal pulse sufficiently to provide an indication that can be seen visually, and means for energizing the visual indicator responsive to the stretched error signal pulse.

* * * * *